Patented Feb. 12, 1935 1,991,240

UNITED STATES PATENT OFFICE 1,991,240

SOLVENT FOR ABSORPTION REFRIGERATING MACHINES

Glenn F. Zellhoefer, Bloomington, Ill.

No Drawing. Application August 28, 1933,
Serial No. 687,045

2 Claims. (Cl. 252—5)

The present invention relates generally to solvent materials for absorption refrigerating machines, and particularly to the type of solvent material for the so-called "two-fluid machines", wherein there is a solvent material adapted to remain liquid throughout the operation of the refrigerator, and a refrigerant material adapted to have a liquid and a vapor phase in the cycles of operation, and adapted to be dissolved in the solvent.

Numerous refrigerants and numerous solvents are known and numerous combinations of these are known.

The present invention is directed to a new solvent material and to the combination thereof with well-known refrigerant material.

One object of the invention is the use of $\beta,\beta'$ dichloroethyl ether, recently produced on a commercial scale by Carbide and Carbon Corporation, as a solvent for a refrigerant.

Another object of the invention is the use of dichloroethyl ether and methyl chloride in combination.

An example of an apparatus in which the new materials have been successfully employed is described in my co-pending application Serial No. 651,306, filed January 12, 1933.

Briefly described, the apparatus specifically referred to, comprises a still in which a mixture of solvent and refrigerant is heated to distill the refrigerant from the solution, a condenser wherein the vapor is condensed to a liquid state, an evaporator wherein the liquid is vaporized at reduced pressure to produce refrigeration, and an absorber in which vapors containing added heat units are again dissolved in the solvent. Suitable heat exchanging and circulation means are included, and automatic controls may be provided.

The particular characteristics of such machines are that the still operates at temperatures well above normal temperatures, such for example at 210° F. to 250° F.; and that the cooling unit operates at temperatures much lower than normal, such as from 5° F. to 40° F. Various parts of the apparatus differ in the prevailing pressures as well as temperatures, and both pressure and temperature determine the physical state of the free refrigerant, whether gaseous or liquid, and determine the solubility relations between the refrigerant and the solvent. It is, therefore, very important that the solvent and the refrigerant be physically adapted for use as individual materials in certain places and for certain functions, and that they be mutually adapted for certain functions when they are in combination. Other qualities not essential to refrigeration, but pertinent to practical usage, control or limit the choice of solvent and refrigerant, such as odor, viscosity, heat capacity, boiling point, freezing point, volatility, chemical stability, reactivity, corrosive action, inflammability, toxicity, etc.

In the following description, the particular advantages and merits of methyl chloride and of $\beta,\beta'$ dichloroethyl ether and of their combination will become apparent as they are discussed with relation to these various important commercial factors.

$\beta,\beta'$ dichloroethyl ether $\beta,\beta'$ dichloroethyl ether has the following characteristics:

Structural formula _____ Cl-CH$_2$-CH$_2$-O-CH$_2$-CH$_2$-Cl
Boiling point (sea level), °F. (°C.) _____ 352.4 (178)
Freezing point, °F. (°C.) _____ −61 (−51.7)
Specific gravity at 20°/20° C. _____ 1.222
Viscosity, centipoises at 25.5° C. _____ 2.0653
Viscosity, Saybolt universal at 77° F. (25° C.), sec. _____ 32
Viscosity, Saybolt universal at 32° F. (0° C.), sec. _____ 39
Vapor pressure at 100° F. (37.8° C.), mm. _____ 10
Latent heat of vaporization, B.t.u./lb. (cal./gram) _____ 115.4 (64.1)
Specific heat at 85° F. (29.4° C.) _____ 0.369
Flash (closed cup), °F. (°C.) _____ 168 (75.6)

The following table No. 1 indicates the solubility characteristics of methyl chloride in $\beta,\beta'$ dichloroethyl ether at 105° F., 90° F., and 75° F. under pressures ranging from five to thirty-five pounds:

TABLE No. 1

Grams of methyl chloride dissolved per gram of $\beta,\beta'$ dichloroethyl ether

| Pressure pounds per sq. in. | Temperature | | |
|---|---|---|---|
| | 75° F. | 90° F. | 105° F. |
| 5 | .106 | .087 | .065 |
| 10 | .150 | .116 | .090 |
| 15 | .207 | .150 | .112 |
| 20 | .262 | .184 | .136 |
| 25 | .315 | .228 | .164 |
| 30 | | .278 | .195 |

The following Table No. 2 indicates the solubility of methyl chloride in $\beta,\beta'$ dichloroethyl ether at one hundred pounds pressure and ranging in temperatures from 210° F. to 250° F.

TABLE No. 2

Grams of methyl chloride per gram of $\beta,\beta'$ dichloroethyl ether

| Temperature | Grams at 100 lbs. per square inch |
|---|---|
| 210 | .145 |
| 220 | .127 |
| 230 | .112 |
| 240 | .102 |
| 250 | .092 |

On the basis of rating the capacity of the machine at one hundred pounds head pressure and thirty pounds back pressure, a machine capable of developing ten tons of refrigeration, using 80° F. tap water entering the system, and 100° F. leaving the system, has been in operation and this chemical has proven satisfactory from the standpoint of view of every consideration.

Its relatively high boiling point enables the machine to operate with 96% to 98% pure methyl chloride in the receiver and with very small loss of heat in the rectifier.

Its heat transfer characteristics are such as to make possible the transfer of heat between the hot, weak liquors leaving the heater, and the cool, strong liquors leaving the absorber in a relatively small heat exchanger with a high degree of efficiency.

For practical and mechanical considerations, it is advantageous that the β,β' dichloroethyl ether is not corrosive towards iron, brass, copper and bronze, and are inert of themselves, and to such metals, in the presence of air and water. Consequently, cast iron parts and flexible copper tubing may be employed in apparatus designed for use with them. β,β' dichloroethyl ether is chemically stable under all conditions of operation and is relatively non-toxic. While the chemical has a slightly ethereal order, it is not pronounced or unpleasant.

Methyl chloride

This material is a gas or vapor at ordinary temperatures, and is subject to liquefaction by increased pressure and by lowered temperature. It is highly soluble in β,β' dichloroethyl ether. Its refrigerant qualities apart from the β,β' dichloroethyl ether are well known. It is essentially odorless, and only slightly toxic. It is non-corrosive towards iron, brass, copper, and bronze, and non-reactive with β,β' dichloroethyl ether. It is difficultly inflammable.

Combination of β,β' dichloroethyl ether and methyl chloride

The solubility characteristics of β,β' dichloroethyl ether and methyl chloride as shown in the above tables are such as to make possible a machine with comparatively high capacity for the size of the equipment required.

The solution of β,β' dichloroethyl ether and methyl chloride is chemically inert under the conditions prevailing in the machine.

What I claim is:

1. A refrigerant mixture for the absorption type of refrigeration apparatus consisting of β,β' dichloroethyl ether as a solvent, and methyl chloride as a refrigerant.

2. A refrigerant mixture for the absorption type of refrigeration apparatus consisting of β,β' dichloroethyl ether as a solvent, and a highly volatile refrigerant soluble in said solvent.

GLENN F. ZELLHOEFER.